Aug. 19, 1958 M. CAMRAS 2,848,221

MAGNETIC RECORDER DRIVE MECHANISM

Filed Feb. 8, 1954

Inventor
Marvin Camras
by Hill, Sherman, Meroni, Gross & Simpson Attys 2,848,221

MAGNETIC RECORDER DRIVE MECHANISM

Marvin Camras, Chicago, Ill., assignor to Armour Research Foundation of Illinois Institute of Technology, Chicago, Ill., a corporation of Illinois Application February 8, 1954, Serial No. 408,679

5 Claims. (Cl. 271—2.3)

This invention relates to a magnetic recorder drive mechanism and more particularly to a tape drive mechanism utilizing an improved manner of holding a tape in frictional engagement with a capstan.

This application is a continuation-in-part of my copending application entitled "Magnetic Recorder Drive Mechanism," filed January 2, 1948, U. S. Serial No. 124, now abandoned.

This invention is directed primarily to a mechanism for driving a magnetic recording tape across a magnetic transducer head but it will be apparent that the invention may be applied to any tape driving mechanism and particularly to any mechanism in which the tape may be driven past transducer means of any form. For example, the tape may be a photographic film and the transducer means may be means for recording a sound track on the film, or for reproducing an audio or video signal from a recording on the film. Tape as used herein means any elongated medium having a generally uniform thickness and a width several times greater than the thickness thereof.

According to this invention, means are provided for holding the tape against a capstan which is preferably of a relatively hard material such as metal and has at least a portion of uniform diameter. The capstan is designed to determine the drive speed of the tape and may preferably have a fly wheel or other inertia means driven therewith.

The means for urging the tape against the capstan comprises a wheel having a plurality of axially spaced resiliently deformable peripheral ridges. By the use of such ridges, a greater resilience or flexibility is obtained with the same material or, conversely, a harder material may be used and still obtain the same degree of flexibility or resilience. In addition, the ridges are independently deformable so that if a particle of foreign matter or a protrusion on the tape should engage one of the ridges, it will not affect the engagement between the other ridges and the tape.

Preferably, the ridges are of equal diameter and most preferably, each ridge forms a complete unbroken annulus about the wheel. This is a distinct advantage in preventing scuffing of the tape but is particularly advantageous when the arrangement is used to drive the tape at a constant speed, as, for example, past transducer means, since with the ridges each forming a complete annulus about the wheel, there can be no hiatus in the drive of the tape.

According to a particular feature of the invention, the portion of the wheel radially inside the ridges, or at least an annular portion of the wheel inside the ridges, is of a resiliently deformable material so that the height or radial dimension of the ridges may be relatively small and yet the ridges may be readily flexed inwardly with the flexure of each ridge being substantially independent of the flexure of any other ridge. By making the ridges of minimum height or radial dimension, there is a minimum tendency for the ridges to flex axially while permitting such flexure in a radial direction.

Most preferably, the ridges together with the annular portion of the wheel providing support therefor may be integral and may, for example, be in the form of a tire of rubber or other elastomeric material and the ridges are defined by axially spaced annular grooves in such tire. It will be appreciated that such tire may be readily formed.

It may be noted that a further advantage of the use of the axially spaced annular ridges is that particles of foreign matter are directed into the grooves between the ridges and may be loosely held therein to be eventually displaced from the grooves by gravity or by centrifugal forces. With a solid periphery, on the other hand, particles will tend to embed themselves in the surface and become more firmly embedded therein each time they ride past the capstan. Such particles could, of course, form a very irregular periphery on the wheel and prevent a constant speed drive of the tape.

In one embodiment of the invention, the periphery of the wheel may engage only the tape and may be of a width, or axial dimension, equal to or less than the width of the tape. This embodiment has an advantage in that it does not tend to wear the edges of the tape, but only wears the tape inside the edges. Also, only one surface of the tape is driven with such an arrangement.

In another preferred embodiment of the invention, the width, or axial dimension, of the periphery of the wheel having the axially spaced annular ridges is greater than the width of the tape and the periphery of the wheel engages the capstan at at least one side, and preferably both sides, of the tape. With this arrangement, there is a direct frictional engagement between the capstan and the wheel to secure a more positive drive of the wheel and the tape is driven both by the wheel and by the capstan. Since the capstan and tape may ordinarily be of smooth materials and since the ridges on the wheel may be of a resilient material such as an elastomeric material having a high coefficient of friction, this drive has a distinct advantage with respect to driving force.

The provision of the axially spaced annular ridges is particularly advantageous with this arrangement in which the ridges engage both the tape and the capstan since the ridges are independently flexible or deformable with flexure or deformation of one of the ridges having substantially no effect on deformation of an adjacent ridge. Thus the periphery of the wheel accommodates itself to the configuration presented by the capstan and the tape to a much greater degree than would be possible with a wheel having a solid periphery.

Further, there is substantially no tendency to wear the tape at the edges thereof any more than at the central portion thereof.

The ridges may, if desired, be spiraled to define a thread, or even a double spiral in left and right hand directions, thus to avoid any tendency of the ridges to wear the tape unevenly. Most preferably, however, these ridges extend parallel to a plane transverse to the axis of the wheel which is particularly advantageous in that the wheel, in addition to maintaining proper drive engagement between the capstan and the tape, also serves to guide the tape over the capstan because the opposite edges of the tape may engage the sides of the ridges to prevent movement of the tape parallel to the axes of the capstan and wheel.

In accordance with a specific feature, the width of the tape may be an integer multiple of the spacing between the medial lines of the grooves between the ridges, By this feature, each edge of the tape will lie in one of the grooves and there will be no tendency for any interference between the ridges and the edges of the tape.

An object of this invention, accordingly, is to provide a tape driving mechanism utilizing an improved manner of holding the tape in engagement with a capstan.

This invention contemplates other and more specific objects, features and advantages which will become more fully apparent from the following detailed description taken in conjunction with the accompanying drawing which illustrates preferred embodiments and in which.

Figure 1:
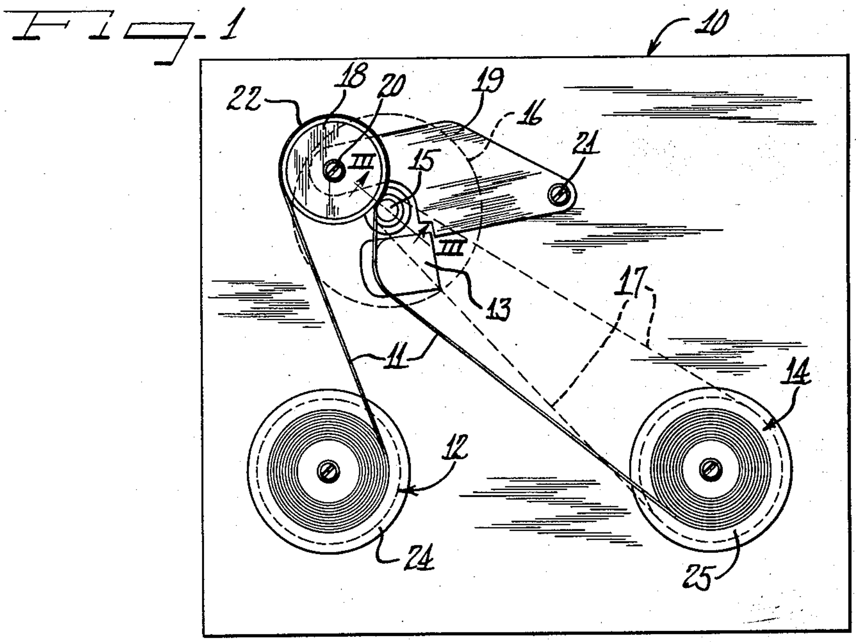
Figure 1 is a top plan view of a magnetic recorder drive mechanism constructed according to the principles of this invention.

Reference numeral 10 generally designates a magnetic recorder drive mechanism constructed according to the principles of this invention in which a tape 11 may be transferred from a supply spool 12 past a magnetic transducer head 13 to a take-up spool 14. To achieve drive of the tape past the recording head 13 at a constant linear speed, the capstan 15 engages the tape 11 adjacent the transducer head 13. The capstan 15 may preferably be driven by means such as a motor 16, indicated only in dotted lines, which may also drive the take-up spool 14 through a belt 17, also indicated only in dotted lines. The inertia of the motor armature, or a separate flywheel, may be utilized to insure constant angular velocity of the capstan 15.

This invention is concerned primarily with means for holding the tape 11 in engagement with the capstan 15 which may comprise a wheel 18 mounted for rotation on a plate 19 by means of a post 20, the plate 19 being pivoted on a fixed post 21.

The tape 11 may extend from the supply spool 12 around a peripheral portion of the wheel 18, around a peripheral portion of the capstan 15 and thence past the transducer means 13 to the take-up spool 14. The pivotal support of the plate 19 on the fixed post 21 may preferably be such that the wheel 18 is urged toward the capstan 15 by tension in the tape 11.

Figure 2:
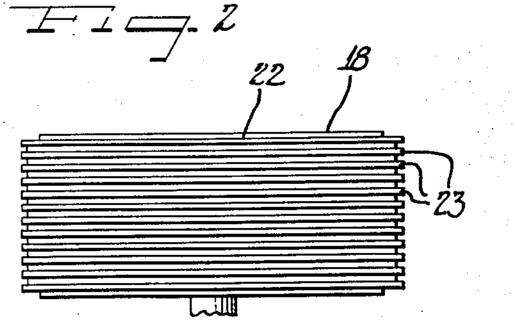
Figure 2 is a detail view, on an enlarged scale, showing in side elevation a wheel used to hold tape against the capstan in the mechanism of Figure 1.

As shown in Figure 2, which is an enlarged detail view in side elevation of the wheel 18, the wheel may have a tire 22 having a plurality of axially spaced peripherally extending ridges 23 integral therewith, which ridges 23 are preferably of equal diameter and which extend parallel to a plane transverse to the axis of the wheel 18. The portion of the tire 22 inside the ridges 23 may be considered as forming an annular portion of the wheel. The tire 22, as well as the ridges 23 integral therewith, are preferably of a resiliently deformable material such as rubber or a like elastomeric material.

It should be noted that each of the ridges 23 forms a complete unbroken annulus about the wheel. This insures against any hiatus in the drive of the tape and insures a constant linear speed of the tape.

Figure 3:
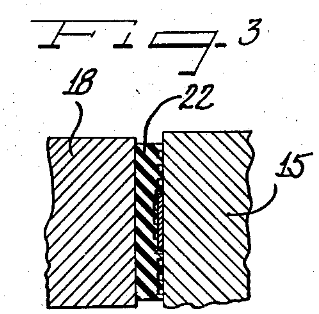
Figure 3 is a sectional view taken substantially along line III—III of Figure 1 and illustrating on an enlarged scale the engagement between the periphery of the wheel, the tape and capstan.

As shown in Figure 3, the width (axial dimension) of the tire 22 is considerably greater than the width of the tape 11 and the tire is aligned and coextensive with a portion of the capstan 15 of uniform diameter, the tape being engaged by a central part of such portion. Thus, certain of the annular teeth or ridges 23 engage the tape 11 with the remaining ridges being engaged with the capstan at opposite sides of the tape. It will be noted that the ridges are deformed substantially independently of one another and the tape 11 and capstan

15 are respectively uniformly engaged by the ridges. Further, there is no tendency to wear the edges of the tape any more than the central portion thereof. It should be noted that the width of the tape is an integer multiple of the spacing between the medial lines of the grooves between the ridges 23. It may further be noted that the height (radial dimension) of the annular ridges is comparatively small relative to the radial dimension of the annular portion of the tire 22 within the ridges, is of the same order of magnitude as the thickness of the tape.

The tape 11 is, of course, guided over the central part of the uniform diameter portion of the capstan 15 by the ridges 23. In addition, and to properly position the tape initially, suitable guide means may be provided. For example, the supply spool 12 and the take-up spool 14 may respectively have lower flanges 24 and 25 on which the tape 11 rests, the upper surfaces of the flanges 24 and 25 being in the same plane as the lower edge of the tape 11 at the capstan as illustrated in Figure 3. If desired, the transducer head 13 may also embody suitable guide means and, of course, any of the guide means well known in the art may be employed.

Figure 4:
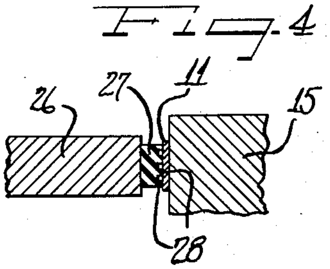
Figure 4 is a view similar to Figure 3 but illustrating a modified arrangement.

Figure 4 illustrates another preferred arrangement which is the same as that described above except that a wheel 26 of less width than the wheel 18 is substituted therefor, the wheel 26 having a tire portion 27, of resilient material, provided with integral annular axially spaced ridges 28. The tire portion 27 is of a width equal to or less than the width of the tape 11 so that the ridges 28 engage only the tape 11 without engaging the tape at the edges. The tape 11 in this embodiment may be maintained in proper position on the capstan 15 by suitable guide means such as the flanges 24 and 25 of the spools 12 and 14.

It will be understood that modifications and variations may be effected without departing from the spirit and scope of the novel concepts of the present invention.

I claim as my invention:

1. In a tape driving mechanism, a capstan having at least a portion of uniform diameter, means arranged to receive tape of a width less than the axial length of said portion and to guide the tape over a central part of said portion, and a wheel having a portion aligned and coextensive with said portion of said capstan for holding the tape thereagainst, said portion of said wheel having a plurality of axially spaced annular grooves.

2. In a tape driving mechanism, a capstan having at least a portion of uniform diameter, means arranged to receive tape of width less than the axial length of said portion and arranged to guide the tape over said portion with the edges of the tape spaced axially from the ends of said portion, and a wheel having a portion aligned and coextensive with said portion of said capstan for urging the tape thereagainst, said portion of said wheel having a plurality of axially spaced grooves defining peripheral ridges therebetween, the width of the tape being an integer multiple of the spacing between the medial lines of said grooves.

3. In a method of driving tape by means of a capstan and a wheel with a plurality of axially spaced circumferential ridges resiliently and independently deflectable, the step of holding the tape against the capstan with said wheel with certain ridges engaging the tape and with other ridges engaging the capstan at one side of the tape.

4. In a tape driving mechanism, a capstan, and a ridged roll pressing tape against said capstan with sufficient pressure to sensibly deform the ridged pressure portions of said roll.

5. In a transducing device for use with a tape record medium, a capstan having at least a portion of uniform diameter, means arranged to receive tape of a width less than the axial length of said portion and to guide the tape over a central part of said portion, transducer means engaging the tape adjacent said capstan, a wheel having a portion aligned and coextensive with said portion of said capstan for holding the tape thereagainst, said portion of said wheel having a plurality of axially spaced annular grooves, and means for driving said capstan at substantially a constant velocity.

References Cited in the file of this patent

UNITED STATES PATENTS 1,998,931 Kellogg ---------------- Apr. 23, 1935

2,287,768 Eckstein ---------------- June 30, 1942
2,326,386 Newman ---------------- Aug. 10, 1943
2,348,355 Miller ---------------- May 9, 1944
2,493,056 Bartelson ---------------- Jan. 3, 1950
2,624,574 Camras ---------------- Jan. 6, 1953

FOREIGN PATENTS 456,884 Great Britain ------------ Nov. 17, 1936